UNITED STATES PATENT OFFICE.

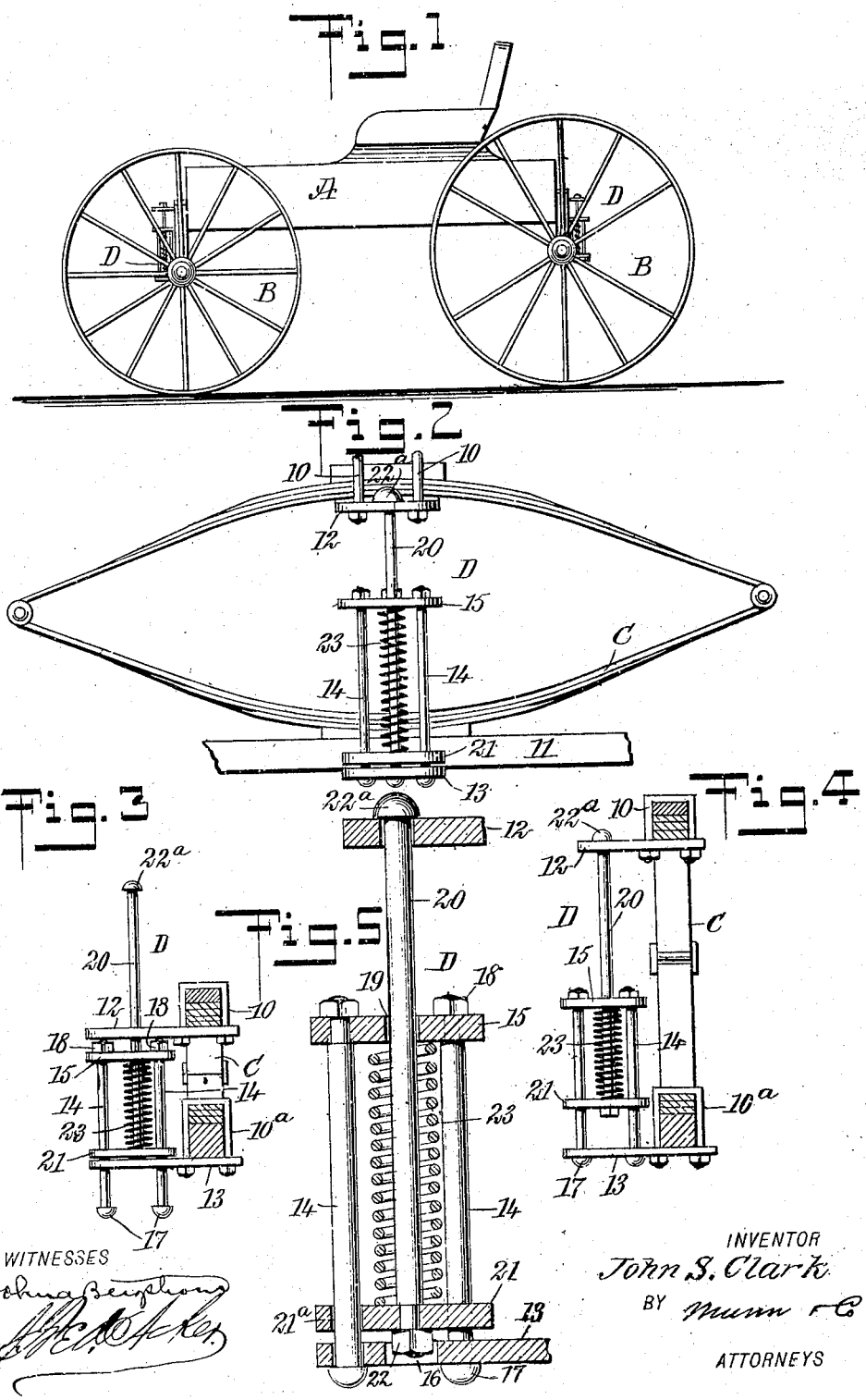

JOHN S. CLARK, OF ISLAND CITY, OREGON.

VEHICLE-SPRING.

No. 881,773.   Specification of Letters Patent.   Patented March 10, 1908.

Application filed August 8, 1906. Serial No. 329,683.

*To all whom it may concern:*

Be it known that I, JOHN S. CLARK, a citizen of the United States, and a resident of Island City, in the county of Union and State of Oregon, have invented a new and useful Improvement in Vehicle-Springs, of which the following is a full, clear, and exact description.

The purpose of my invention is to provide a supplemental spring for use upon spring vehicles that will act as a buffer and reinforcing spring, preventing the springs from bumping together or breaking when overloaded, and at the same time adding any given amount to the carrying capacity of the springs without impairing their elasticity and ease of vibration when under a normal load.

Another purpose of the invention is to prevent the up-throw or rebound when passing over rough roads or obstructions, to prevent the springs from unduly expanding and breaking, and likewise prevent violently disturbing the occupants of the vehicle, as is often the case where the springs are not held in restraint.

A further purpose of the invention is to provide a device of the character mentioned which is light in weight, economic in construction and which can be varied to suit the various conditions under which it may be desirable to use it, and whereby its application is simple and effective for the purposes intended.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of a buggy illustrating the application of the device; Fig. 2 is an enlarged side elevation of a spring of a vehicle and an outer face view of the applied device; Fig. 3 is a vertical section through the spring and a side view of the device, illustrating both under severe compression; Fig. 4 is a view similar to that shown in Fig. 3, but illustrating the spring and the device expanded; and Fig. 5 is an enlarged vertical section through the device, the parts thereof being in normal position.

A represents the body of a buggy, B the wheels thereof and C the forward and the rear springs of the vehicle, which springs are usually attached by the customary clips 10 to the body or to a cross bar beneath the body, and to the axles 11 of the wheels or other suitable lower supports, said clips for attaching the springs to the axles being designated as 10ª in the drawings.

A horizontal bracket 12 is located at the upper central portion of each spring C at the inner faces of the springs, and said brackets 12 extend preferably outward from the springs. Corresponding lower brackets 13 are provided for the said springs C, being held in place by the lower clips 10ª. An improved buffer D is located between the upper and the lower brackets 12 and 13 of each spring, and each buffer is of the following construction:

Vertical guide rods 14 are loosely mounted in the lower bracket 13, and are fixedly secured to an upper plate 15 parallel with the said bracket 13, the plate 15 being usually of the same general contour as the outer or projecting portion of the said bracket 13.

The lower bracket 13 is provided with a central opening 16 and the lower ends of the guide rods 14 have heads 17 formed thereon. The upper ends of said guide rods 14 are preferably reduced and passed through suitable openings in the intermediate plate 15 so as to form shoulders on the rods on which the said plate 15 can rest; and each rod 14 is provided with a nut 18 at its upper end. Further, in the construction of the intermediate plate 15 a central opening 19 is made, corresponding to the opening 16 in the lower bracket 13.

Any desired number of guide rods 14 may be employed, but usually and preferably the guide rods are three in number and are arranged triangularly, and a triangular shape is also preferably given to the intermediate plate 15 and the outer portion of the bracket 13.

A connecting rod 20 is passed through an opening in the central portion of the upper bracket 12, and the upper end of said connecting rod 20 is provided with a head 22ª. This connecting rod 20 is passed down through the opening 19 in the intermediate fixed plate 15 and is secured at its lower end to a plate 21 of practically the same formation as the fixed intermediate plate 15; and said plate 21 is provided with apertures 21ª through which the guide rods 14 loosely pass. The lower end of the rod 20 has a nut 22 applied thereto, which when the sliding plate 21 is in its lower or normal position extends down into the opening 16 in the lower bracket 13. A spring 23 is coiled around the connecting rod 20 having bearing upon the sliding plate 21 and the intermediate fixed plate 15.

In operation, when the springs C are compressed, the springs 23 of the buffers are likewise placed under compression in a downward direction as shown in Fig. 3, which compression is accomplished when the elliptical or vehicle springs C have been pressed down sufficiently to bring their upper brackets 12 in engagement with the intermediate plate 15 fixed to the guide rods or bars 14, and at such time the said plate 15 is carried downward and the rods 14 slide through the lower or fixed bracket 13. In this manner the springs 23 of a buffer D assists the vehicle spring with which it is connected to sustain the load.

In Fig. 4 the elliptical or vehicle springs are shown expanded, which position they often assume when the wheels of the vehicle enter a deep rut in the road, for example; and at such time as the body of the vehicle rides up with the rising of the connected spring C the connecting rods 20 are carried upward and will in turn draw upward the sliding plate 21, placing the buffer springs 23 under compression in an upward direction, thus relieving the elliptical spring C from undue tension or strain.

I desire it to be understood that I do not confine myself to the exact form of the construction shown in the drawings, but that the form of construction and method of attaching said device may be varied to suit the various conditions met with in different vehicles; that I can use one or more coil springs, and that the number of vertical rods can be changed as may be found necessary or desirable, without departing from the spirit of the invention.

Having thus described my invention, I claim as new, and desire to secure by Letters Patent,—

1. The combination with a vehicle spring and it lower support, of brackets extending one from the top of the spring and the other from the said lower support therefor, the brackets located at the central portion of the spring, a frame having a sliding connection with both brackets, and a spring carried by said frame, which spring is placed under compression as the main spring is unduly compressed or expanded.

2. The combination with an elliptical vehicle spring and an upper and a lower bracket extending out from the central portions of the said elliptical spring, of a frame consisting of a lower plate located above the lower bracket, an upper plate located between the two brackets, guide bars secured to the upper plate and loosely passed through the lower plate and bracket, a connecting rod loosely passed through the upper bracket and through the upper and lower plates of said frame, being secured to the lower plate of the frame, and a spring coiled around the connecting rod between the two plates of the frame.

3. The combination with an elliptical vehicle spring, and an upper and a lower bracket extending out horizontally from the central portions of the elliptical spring, of a plate located between the two brackets adjacent to the upper one, a lower plate which lies normally in engagement with the upper face of the lower bracket, guide rods secured to said upper plate, being passed loosely through the lower plate, terminating in heads at their lower ends, a connecting rod having a head at its upper end, which connecting rod is passed loosely through the upper bracket and loosely through the said upper plate and is secured to the lower plate, and a spring coiled around said connecting rod and having bearing against both of said upper and lower plates.

4. The combination with a vehicle spring, of a frame having sliding connection with the spring at its top, being otherwise independent thereof, and an independent spring carried by the said frame, which latter spring is placed under compression whenever the main spring is unduly compressed or expanded.

In testimony whereof I have signed my name to this specification, in the presence of two subscribing witnesses.

JOHN S. CLARK

Witnesses:
 ALBERT R. HUNTER,
 CHARLES H. CONKEY